P8003 OR RE 15,960 3

BEST AVAILABLE COPY 1,418,148

Dec. 9, 1924.

Re. 15,960

H. HARRIS

METHOD OF AND APPARATUS FOR REFINING MOLTEN METAL

Original Filed Jan. 29. 1920

INVENTOR
Henry Harris
BY
Ward Crosby Smith
ATTORNEYS

Examiner

Reissued Dec. 9, 1924.

Re. 15,960

UNITED STATES PATENT OFFICE.

HENRY HARRIS, OF LONDON, ENGLAND.

METHOD OF AND APPARATUS FOR REFINING MOLTEN METAL.

Original No. 1,418,148, dated May 30, 1922, Serial No. 354,852, filed January 29, 1920. Application for reissue filed March 10, 1924. Serial No. 698,279.

*To all whom it may concern:*

Be it known that I, HENRY HARRIS, a subject of the King of Great Britain, residing in London, England, have invented certain new and useful Improvements in the Methods of and Apparatus for Refining Molten Metal, of which the following is a specification.

The refining of metals by causing them in molten condition to pass in thin streams through a molten reagent is known.

It is the object of this invention to provide an improvement upon this mode of and apparatus for refining, whereby the metal may be easily, efficiently and economically treated. According to certain aspects of my invention the molten metal may be treated with the same reagent several times or with a fresh reagent.

According to the preferred embodiment of the invention, I confine the molten reagent in a vertical cylinder open at both ends and sealed at its lower end by some of the refined molten metal so as to prevent the passing of the reagent with the molten metal, and I provide means whereby the molten metal may be passed in thin streams several times through the air and the molten reagent, preferably until the impurities most easily removed by that reagent substantially disappear from the molten metal. In this manner the reagent is efficiently used, the metal and reagent are handled in a convenient and economical manner, and in the case of lead, the metal may be reliably atmospherically oxidized by being repeatedly sprayed through the air so as to greatly cut down the cost of refining. Also because of the intimacy of contact of the molten metal with the molten reagent due to the repeated passing of the metal through the reagent, the latter may even act fractionally so that in case of refining molten lead, for instance, copper may be removed, and then, by changing the reagent, arsenic, tin and antimony.

When the reagent has performed its function it may be allowed to solidify so that the cylinder can be removed and another put in its place to receive fresh reagent.

Figure 1:
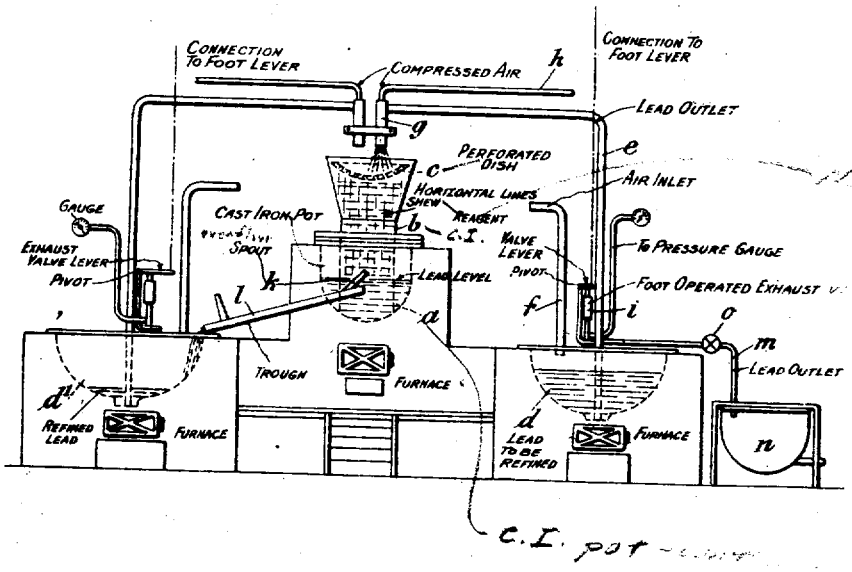
Figure 2:
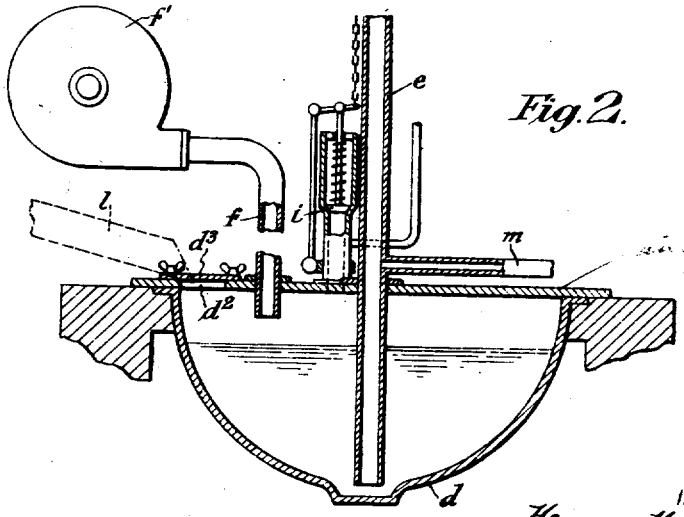

The accompanying drawings illustrate, by way of example, a plant embodying the invention, Fig. 1 being a diagram of the plant and Fig. 2 a vertical section drawn to an enlarged scale through one of the melting pots.

*a* is a cast iron pot set in a furnace and containing lead. In this pot is set a cast iron cylinder *b* splayed out at its upper part where it contains a suitably perforated dish *c*. Into this cylinder is introduced the reagent, for instance common salt, the melting point of which has been reduced by admixture of caustic soda, preferably to a temperature not exceeding about 500° C. below which temperature the lead is preferably maintained (see my United States Patent No. 1,395,820, granted upon my application Serial No. 354,851). The heat of the furnace, conducted through the lead, may suffice to keep the reagent molten until it becomes nearly exhausted; if this heat is not sufficient the cylinder must be heated.

The lead to be refined is contained in a pot *d* set in a furnace and covered substantially air-tight. Through the cover extends air-tight, a pipe *e* terminating at the bottom of the pot and a pipe *f* leading from a compressor *f'* and terminating above the surface of the lead. The pipe *e* ends above the dish *c* in a short pipe *g* of somewhat wider bore in the axis of which is a narrow pipe *h*.

A suitable exhaust valve *i* having been closed, the pressure of a source of compressed air connected with pipe *f* forces the lead up pipe *e*, and discharges it through pipe *g* where it may be sprayed into dish *c* by a jet of compressed air through pipe *h*. The metal falls in streams consisting of fine drops through the molten reagent in cylinder *b*, leaves pot *a* by an overflow spout *k* and is conducted into a suitable receptacle. In case a single treatment does not sufficiently refine the lead the said suitable receptacle may be, as here shown, a second melting pot *d'* provided with pipes as already described with reference to pot *d*, so that when this pot *d'* has received all the lead that was in pot *d*, this lead may be forced back through the reagent, the gutter *l* being swung over to discharge the refined lead into pot *d*. Each of the pots *d*, *d'* has on its cover an opening $d^2$ capable of being hermetically closed by a cover $d^3$ and opened when the pot is to act as receiver. When the lead has been refined the valve *i* is sufficiently closed to permit the air pressure in pot *d* to force the lead through pipe *m*, which communicates with the pipe *e*, into pot *n*, the valve *o* having been opened; it being understood that during this operation the air pressure is so regulated that the lead does not rise high enough in the pipe *e* to discharge into the dish *c*.

While, by way of example, I have referred specifically to the method and apparatus for treating molten lead, it will be understood by those skilled in the art, after understanding my invention, that so far as concerns the broader aspect of the invention it is not limited to this use, and that, without departing from the spirit or scope of my invention, various modifications and changes may be made, and that certain features may be omitted, depending upon the particular embodiment of the invention desired or the conditions under which it is to be used, and I aim in the appended claims to cover all such modifications and changes as come within the spirit and scope of the invention:

Having thus described the nature of the said invention and the best means I know of carrying the same into practical effect, I claim:

1. In apparatus for refining molten metal, the combination of a container for a molten reagent lighter than the metal, said container having an opening at its upper end for the passage of the metal thereto and having an opening at its discharge end for the passage of the metal therefrom, said container being sealed at its discharge end with some of the molten metal so as to prevent the passing of molten reagent with the metal, means for containing the molten metal to be refined, and means for causing said metal to pass in distributed form several times through the molten reagent.

2. In apparatus for refining molten metal, the combination of an upright container for holding a molten reagent lighter than the metal, said container having an opening at its upper end for the passage of the metal thereto and having an opening at its lower end for the passage of the metal therefrom, means co-operating with the lower end of the container to seal the latter with some of the molten metal so as to prevent the passing of molten reagent with the metal, means comprising pressure-creating means and metal-conducting means for causing the metal to pass several times through the molten reagent, and means for causing the metal to be distributed in the reagent.

3. In apparatus for refining molten metal, the combination of an upright container for holding a molten reagent lighter than the metal, said container being open-ended for the passage of the metal thereto and therefrom and sealed at its lower end by the metal so as to prevent the passage therefrom of molten reagent with the metal, means for containing the molten metal to be refined, means for circulating the metal through the reagent, and a nozzle for causing the flowing metal to be delivered in distributed form into the reagent container.

4. In apparatus for refining molten metal, the combination of an upright container for holding a molten reagent lighter than the metal, said container having an opening at its upper end for the passage of the metal thereto and having an opening at its lower end for the passage of the metal therefrom, said container being sealed at its discharge end with some of the molten metal so as to prevent the passing of molten reagent with the metal, heated means for containing the molten metal to be refined, and means whereby the metal may be caused to circulate through the reagent until the impurities to be removed thereby substantially disappear from the metal, and means for spraying the metal into the molten reagent.

5. In apparatus for refining molten metal, the combination of an upright container for holding a substantial column of a molten reagent lighter than the metal, said container having an opening at its upper end for the passage of the metal thereto and having an opening at its lower end for the passage of the metal thereto and having an opening at its lower end for the passage of the metal therefrom, means co-operating with the lower end of the container to seal the latter with some of the molten metal so as to prevent the passing of molten reagent with the metal, means for containing the molten metal to be refined, said means being so located with respect to the reagent container that the level of the metal therein is below the level of the reagent in the upright container, means operatively related to the molten metal in said metal-containing means to cause the metal to be forced from the metal-containing means into the reagent container, and means for causing the flowing metal to be delivered in distributed form into the molten reagent.

6. In apparatus for refining molten metal, the combination of an upright container for holding a molten reagent lighter than the metal, said container having an opening at its upper end for the passage of the metal thereto and having an opening at its lower end for the passage of the metal therefrom, means co-operating with the lower end of the container to seal the latter with some of the molten metal so as to prevent the passing of molten reagent with the metal, means for causing the metal to pass several times through the molten reagent, and means for conducting fluid under pressure into contact with the stream of metal above the reagent for the purpose of causing the metal to be discharged in distributed form.

7. In apparatus for refining molten metal, the combination of an upright container for holding a substantial column of a molten reagent lighter than the metal, said container having an opening at its upper end for the passage of the metal thereto and having an opening at its lower end for the passage of the metal therefrom, means co-operating with the lower end of the container to seal the latter with some of the molten metal so as to prevent the passing of molten reagent with the metal, means for containing the molten metal to be refined, said means being so located with respect to the reagent container that the level of the metal therein is below the level of the reagent in the upright container, means whereby the metal may be caused to circulate through the reagent until the impurities to be removed thereby substantially disappear from the metal, and a nozzle for causing the flowing metal to be delivered in distributed form into the reagent container.

8. In apparatus for refining molten metal, the combination of an upright container for holding a molten reagent lighter than the metal, said container having an opening at its upper end for the passage of the metal thereto and having an opening at its lower end for the passage of the metal therefrom, said container being sealed at its discharge end with some of the molten metal so as to prevent the passing of the molten reagent with the metal, means comprising pressure-creating means and metal-conducting means for causing the metal to pass several times through the molten reagent, a nozzle for spraying the flowing metal into the container, and a mechanical distributor within the container engaging said sprayed metal.

9. In apparatus for refining molten metal, the combination of a heated pot adapted to contain molten metal, an upright cylinder with an opening at the top for receiving the molten metal and adapted to contain a molten reagent and having its lower end beneath the surface of the molten metal in the pot, an air spray adapted to charge the molten metal into the reagent container while at the same time causing the metal to be partially oxidized, and means for conducting the metal to the air spray.

10. An apparatus for refining metals, comprising a heated pot adapted to contain the molten metal, a vertical open-ended cylinder adapted to contain a molten reagent and having its lower end beneath the surface of the molten metal in the pot, a distributor at the upper part of the cylinder, and a device for charging the distributor with the molten metal.

11. An apparatus for refining metals, comprising a heated pot adapted to contain the molten metal, a vertical open-ended cylinder adapted to contain a molten reagent and having its lower end beneath the surface of the molten metal in the pot, a distributor at the upper part of the cylinder and an air spray adapted to charge the molten metal to the distributor while at the same time partially oxidizing the metal.

12. An apparatus for refining metals, comprising a heated pot adapted to contain the molten metal, a vertical open-ended cylinder adapted to contain a molten reagent and having its lower end beneath the surface of the molten metal in the pot, a distributor at the upper part of the cylinder, two melting pots at a lower level than the aforesaid pot, a device for raising the molten metal from each melting pot to the distributor and a device whereby the lead can be allowed to flow from the aforesaid pot to either melting pot, whereby the molten metal may be transferred from either melting pot to the other and may pass through the molten reagent on its way.

13. Method of refining molten metal which comprises confining a molten reagent in a container, and repeatedly passing the molten metal through the molten reagent while maintaining the lower end of the container sealed by the molten metal being refined in a manner to prevent passing of molten reagent with the metal.

14. Method of refining molten metal which comprises confining a molten reagent in the form of a substantial column of the same by means of an upright container, and repeatedly passing the molten metal, in distributed or sprayed form, through the molten reagent while maintaining the lower end of the container sealed by the molten metal being refined in a manner to prevent passing of molten reagent with the metal.

15. Method of refining molten metal having a melting point below 500° C., which comprises confining a molten reagent in the form of a substantial column of the same by means of an upright container, and repeatedly passing the molten metal in distributed or sprayed form through the molten reagent while maintaining the lower end of the container sealed by the molten metal being refined in a manner to prevent passing of the molten reagent with the metal and conducting the operation at a temperature not exceeding about 500° C.

16. Method of refining lead which comprises confining a molten reagent comprising sodium chlorid and caustic soda in the form of a substantial column of the same by means of an upright container, repeatedly passing the lead in distributed or sprayed form through said molten reagent until one or more of the impurities to be removed thereby substantially disappear from the lead, while maintaining the lower end of the container sealed by the molten lead being refined in a manner to prevent passing of molten reagent with the lead.

17. Method of refining lead which comprises passing the molten lead repeatedly through a molten reagent comprising sodium chlorid and caustic soda contained in a receptacle having its lower end sealed by molten lead being refined in a manner to prevent the passing of the reagent with the lead, and conducting the operation at a temperature substantially below the melting point of sodium chlorid.

18. Method of refining lead which comprises confining a molten reagent comprising sodium chlorid and caustic soda in the form of a substantial column of the same by means of an upright container, repeatedly passing the lead in distributed or sprayed form through said molten reagent until one or more of the impurities to be removed thereby substantially disappear from the lead, while maintaining the lower end of the container sealed by the molten lead being refined in a manner to prevent the passing of molten reagent with the lead, and conducting the operation at a temperature not exceeding about 500° C.

19. Method of refining lead which comprises confining a molten reagent comprising sodium chlorid and caustic soda in a container having its lower end sealed by the molten lead being refined in a manner to prevent the passing of the molten reagent with the lead, and repeatedly passing the lead in distributed or sprayed form through the atmosphere and through said molten reagent while maintaining the seal at the lower end of the container, and conducting the operation at a temperature not exceeding about 500° C., whereby the lead is reliably atmospherically oxidized at said desired low temperature and the reagent efficiently utilized.

20. Method of refining lead which comprises confining a molten reagent comprising sodium chlorid and caustic soda in a container having its lower end sealed by the molten lead being refined, and repeatedly passing the lead in distributed or sprayed form through said molten reagent while maintaining the seal at the lower end of the container, and conducting the operation under oxidizing conditions and at a temperature not exceeding about 500° C.

21. Method of refining lead which comprises confining a molten reagent comprising sodium chlorid and caustic soda in a container having its lower end sealed by the molten lead being refined, and repeatedly passing the lead in distributed or sprayed form through said molten reagent while maintaining the seal at the lower end of the container, and conducting the operation at a temperature substantially below the melting point of sodium chlorid.

In testimony whereof I have signed my name to this specification.

HENRY HARRIS.